United States Patent Office 3,629,134
Patented Dec. 21, 1971

3,629,134
METHOD OF MAINTAINING VARIABLE DENSITY DISSOLVER SOLUTIONS CRITICALLY SAFE
Donald W. Rhodes, Idaho Falls, Idaho, assignor to the United States of America as represented by the United States Atomic Energy Commission
No Drawing. Filed Apr. 7, 1969, Ser. No. 814,523
Int. Cl. G21c 7/08
U.S. Cl. 252—301.1 R                    2 Claims

ABSTRACT OF THE DISCLOSURE

A dissolver vessel can be made critically safe during the dissolution of nuclear fuel by adding insoluble particulate poisons to the dissolvent. The insoluble poison particles have a density range so that a sufficient amount of poison is always in suspension even though the dissolvent changes density during the dissolution process.

CONTRACTUAL ORIGIN OF THE INVENTION

The invention described herein was made in the course of, or under, a contract with the United States Atomic Energy Commission.

BACKGROUND OF THE INVENTION

This invention relates to a process for making solutions containing fissionable material critically safe and, more particularly, this invention relates to a process for making solutions of variable density critically safe.

During the reprocessing of spent nuclear fuel, the fuel elements are first declad and then the fuel, whether it is in the form of metal, oxides or carbides, is converted to a suitable feed for the process. For those reprocessing schemes that require a liquid feed, it is often prepared in large dissolver vessels. One problem inherent with large dissolver vessels is the criticality of the dissolvent in them. As large amounts of spent nuclear fuel are introduced into the dissolver vessel some means must be provided for preventing the solution from becoming critical.

One of the most widely used methods is to add a soluble neutron-absorbing material, or poison, to the dissolvent in sufficient quantities to render the dissolver vessel critically safe, but there are several disadvantages to this method. During dissolution the dissolvent varies in pH and the poison's solubility may be affected. If the poison's solubility in the dissolvent decreases, the poison may precipitate and cause a potentially dangerous condition. In addition, dissolution of various materials during reprocessing alters the chemistry of the dissolvent and may deleteriously affect the poison's solubility. Another disadvantage of a soluble poison is that it is lost when the dissolvent is rejected to waste. In some cases this involves considerable expense.

These and other disadvantages have been overcome by the process of this invention which completely eliminates from consideration changes in pH, the amount or type of material dissolved and permits recovery of the poison before the dissolvent is rejected to waste.

SUMMARY OF THE INVENTION

This invention comprises adding to a solution containing fissionable material an insoluble particulate neutron-absorbing material and, if the solution density is variable, then the particulate material added has a density range such that sufficient particles are always in suspension to maintain the solution critically safe.

DETAILED DESCRIPTION OF THE PREFERRED EMBODIMENT

Dissolvents for spent nuclear fuels are often maintained at elevated temperatures and range from about 0.5 to about 1.0 molar in acid. Therefore, a poison must be chosen which is insoluble under these highly acid and high temperature conditions. While boron is an art-recognized poison, it is usually added to a dissolver solution in soluble form. Crystalline boron is insoluble in the boiling acids used in these dissolution processes, such as hydrofluoric or nitric acids, and it may be used as an insoluble poison. Commercially available materials such as chemically non-reactive polyethylene impregnated with boron oxide, boron carbide or metallic boron are acceptable alternatives to crystalline boron. Other recognized poisons, such as cadmium, hafnium, gadolinium, or compounds thereof, are applicable to this invention provided they are insoluble in the particular dissolvent to which they are added.

Since some of the dissolvents may change density from about 1.0 gm./cc. to about 1.3 gm./cc., the insolvent poison is preferably added to them as particulate material having a density range coextensive with that of the dissolvent. In this way, some of the particulate poisons are in suspension during the entire process and maintain the dissolver vessel critically safe. In some cases mechanical agitation of the dissolvent may be necessary to maintain an even dispersion of the poisons but where chemical reaction, sparging or thermal currents provide sufficient agitation extraneous means are not required. Even if some of the poison particles settle out of the dissolvent this is not serious but may be beneficial if some of the fissionable material has precipitated.

Recovery of the insoluble particulate poison before the dissolvent is rejected to waste is easily accomplished by passing the dissolvent through screens of appropriate mesh numbers or by centrifuging. Whichever method is used the particulate poisons may be reused a number of times.

For instance it has been calculated that spheres 2 mm. in diameter of chemically resistant polyethylene impregnated with 10 to 30 weight percent crystalline boron have densities from about 1.09 gm./cc. to about 1.36 gm./cc. The addition of about 3500 to about 4000 of these spheres per liter of dissolvent would be sufficient to render most dissolver solutions critically safe. By varying the weight percent of boron in 5% increments, an adequately even density distribution is attained.

If the boron impregnated polyethylene is obtained in rods which are then chopped to the proper length, the chopped rods may be spray coated to prevent leaching of boron from the rods. Experience with boron-loaded stainless steel in dissolver solutions has shown that boron leaching is not too great, generally less than $\frac{1}{10}$%, and can be tolerated. An alternative preparation is the calcination of molten polyethylene sprayed into a fluidized bed of crystalline boron particles to produce spheres of polyethylene containing crystalline boron. While 100% coverage of the boron is not possible, greater than 90% is and that is sufficient.

While the above example specifically sets out boron as the poison and polyethylene as the chemically inert carrier the invention, as stated above, is not limited thereto but includes other materials and combinations thereof depending upon the particular dissolvent.

It will be understood that the invention is not to be limited to the details given herein but that it may be modified within the scope of the appended claims.

The embodiments of the invention in which an exclusive property or privilege is claimed are defined as follows:

1. A method of making a solution containing fissionable materials critically safe comprising adding to the solution a particulate insoluble neutron-absorbing material having a density range coextensive with that of the solution and maintaining the insoluble neutron-absorbing material substantially evenly dispersed throughout the solution.

2. A method of rendering critically safe an acidic nuclear fuel reprocessing solution which changes density between about 1.0 to 1.3 gm./cc. during use comprising adding per liter of reprocessing solution about 3500 to 4000 spheres, each about 2 mm. in diameter, of chemically resistant polyethylene containing from about 10 to about 30 weight percent of crystalline boron distributed therein, said spheres having a density range coextensive with that of the solution.

References Cited

UNITED STATES PATENTS 3,423,375   1/1969   Strand _____ 260—79.3
3,476,526   11/1969  Hartzel _____ 176—93

OTHER REFERENCES

Wachter, J. W., "Homogeneous and Heterogeneous Poisoning As Potential Methods for Controlling Criticality," pp. 297–298.

BENJAMIN R. PADGETT, Primary Examiner

R. L. TATE, Assistant Examiner

U.S. Cl. X.R.

23—342; 176—93